United States Patent [19]
Koetsch

[11] Patent Number: 5,471,752
[45] Date of Patent: Dec. 5, 1995

[54] HIGH TENSION HACKSAW FRAME

[75] Inventor: Paul W. Koetsch, Springfield, Mass.

[73] Assignee: Cooper Industries, Inc., Houston, Tex.

[21] Appl. No.: 301,204

[22] Filed: Sep. 6, 1994

[51] Int. Cl.[6] .................................................. B27B 21/02
[52] U.S. Cl. ................................................ 30/513; 30/506
[58] Field of Search ............................ 30/513, 517, 506, 30/507, 125

[56] References Cited

U.S. PATENT DOCUMENTS

| | | | |
|---|---|---|---|
| 925,112 | 6/1909 | Leland | 30/513 |
| 1,194,234 | 8/1916 | Remington | 30/513 |
| 2,658,541 | 11/1953 | Heuneman | 30/517 |
| 2,725,085 | 11/1955 | Doherty et al. | 30/513 |
| 2,796,098 | 6/1957 | Dreier | 30/506 |
| 2,808,086 | 10/1957 | Drier | 30/506 |
| 3,327,748 | 6/1967 | Reuterfors | 30/513 |
| 4,256,156 | 3/1981 | Biszantz et al. | 30/513 |
| 4,367,779 | 1/1983 | Ewig | 30/506 |
| 4,466,471 | 8/1984 | Thomson | 30/517 |
| 4,592,145 | 6/1986 | Egan et al. | 30/513 |
| 4,662,070 | 5/1987 | Reddig | 30/125 |

Primary Examiner—Hwei Siu Payer
Attorney, Agent, or Firm—Burns, Doane, Swecker & Mathis

[57] ABSTRACT

An improved blade tensioning mechanism carried by a hacksaw handle is disclosed. It consists of a longitudinally extending frame member with a handle attached at one end and a pivoting lever attached at the end opposite the handle. A blade anchoring pin, or pins, are located on the pivoting lever and on the handle allowing the attachment of a blade. The pivoting lever has attached to it an extension bar that substantially runs the length of the longitudinal frame member and, when turned in a clockwise direction, is captured at the handle end with a spring loaded lock located at the top of the handle portion of the frame. Fine adjustments to the amount of tension are accomplished by the adjustment of a screw which effectively lengthens the longitudinal member with relation to the blade anchoring pins, raising or lowering the amount of tension accordingly. The screw is tightened with the tension released from the blade. A cushion safety grip provides protection against accidental dislodging of the spring loaded lock.

18 Claims, 5 Drawing Sheets

HIGH TENSION HACKSAW FRAME

BACKGROUND OF INVENTION

This invention relates generally to hacksaw frames, specifically to high tension types of frames capable of achieving the 25,000 to 40,000 P.S.I. of tension required for efficient operation of bi-metal type hacksaw blades.

Prior forms of high tension hacksaw frames such as the Bissantz et al U.S. Pat. No. 4,256,156, the Dreier U.S. Pat. No. 2,796,098, the Ewig U.S. Pat. No. 4,367,779 and the Thompson U.S. Pat. No. 4,466,471 all show some form of threaded rod tensioning device that is operated either by a lever, knurled nut, or wing nut. Additionally, many of the currently marketed frames have the majority of their tensioning mechanisms located in the handle portion of the hacksaw frame.

The threaded mechanisms previously mentioned are subject to wear and abuse that often causes the threads to malfunction or strip which prevents them from reaching their full tension, or possibly prevents them from operating at all. The wing nuts, levers and knurled nuts mentioned previously may, if located at the bottom of the handle cause an obstruction to the cutting path and prevent the most efficient use of the frame. With the tensioning mechanisms located in the handle portion of the frame, the size, and to some degree, the shape of the handle is determined by the mechanism that has to fit within it, thus producing an uncomfortable grip that promotes operator fatigue or discomfort.

It is the object of this invention to provide a hacksaw frame with an improved tensioning mechanism that overcomes the afore-mentioned problems by eliminating the threaded rods and relocating the tension mechanism away from the handle.

SUMMARY OF PREFERRED EMBODIMENT OF INVENTION

This invention relates to an improved blade tensioning mechanism carried by a hacksaw handle. It consists of a longitudinally extending frame member with a handle attached at one end and a pivoting lever attached at the end opposite the handle. A blade anchoring pin, or pins, are located on the pivoting lever and on the handle allowing the location and attachment of a blade. The pivoting lever has attached to it an extension bar that substantially runs the length of the longitudinal frame member and, when urged in the clockwise direction is captured at the handle end with a spring loaded latch located at the top of the handle portion of the frame. Fine adjustments to the amount of tension are accomplished by the adjustment of a screw which effectively lengthens the longitudinal member with relation to the blade anchoring pins, raising or lowering the amount of tension accordingly. This adjustment is made with the tension released from the blade.

The pivoting lever also has attached to it a top grip portion that provides a positive grip for the user and acts as a safety device that prevents the latch from being inadvertently urged backward in a frontal impact. At the handle end of the longitudinally extended handle member is a magnetic device that attaches the handle to the longitudinal member and magnetically captures the spare blades that are stored under the pivoting lever.

DETAILED DESCRIPTION OF THE DRAWINGS

Figure 1:
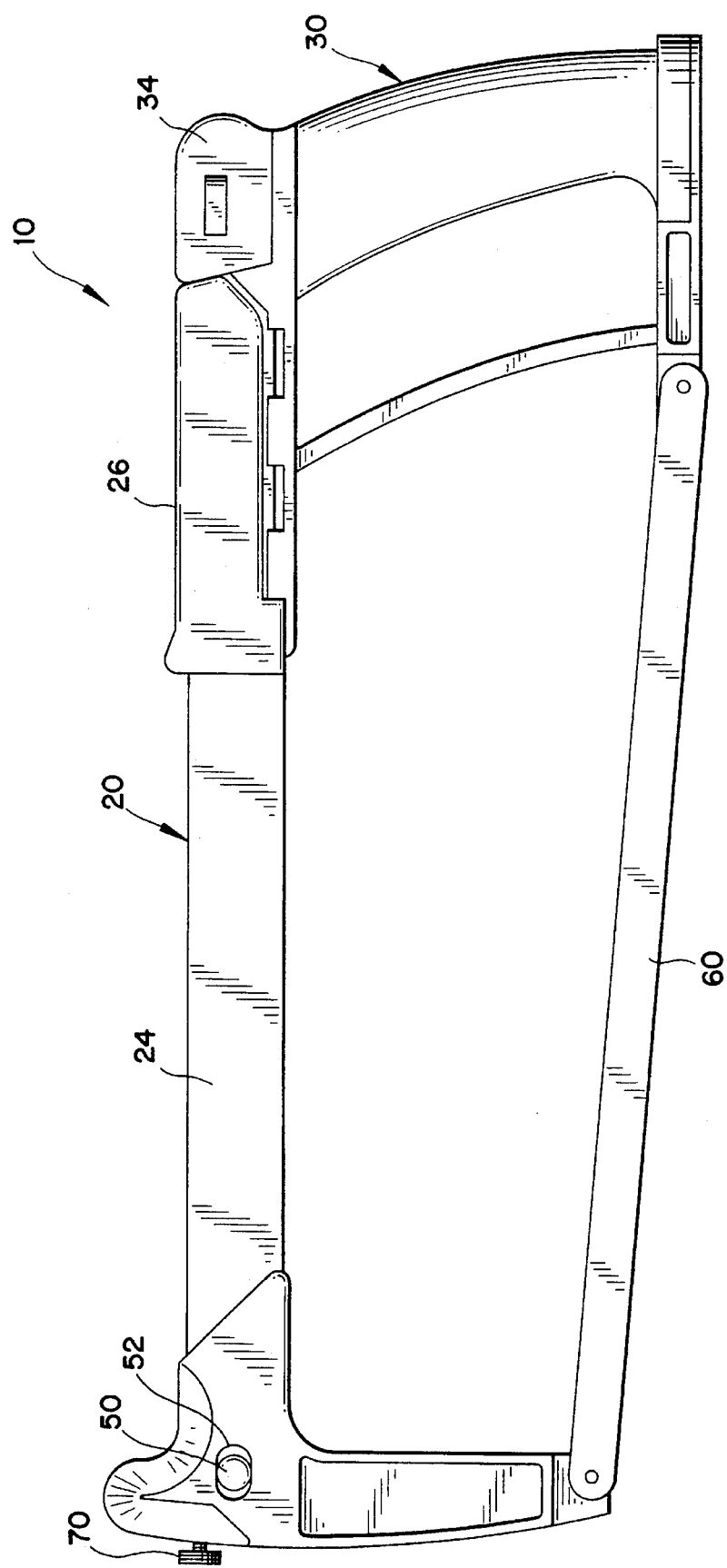
FIG. 1 shows a side view of a hacksaw according to the present invention.

A hacksaw according to the present invention is shown in FIG. 1 and referred to in general by Numeral 10. The major components of hacksaw 10 are lever assembly 20, pistol grip assembly 30, and saw blade 60.

Figure 2:
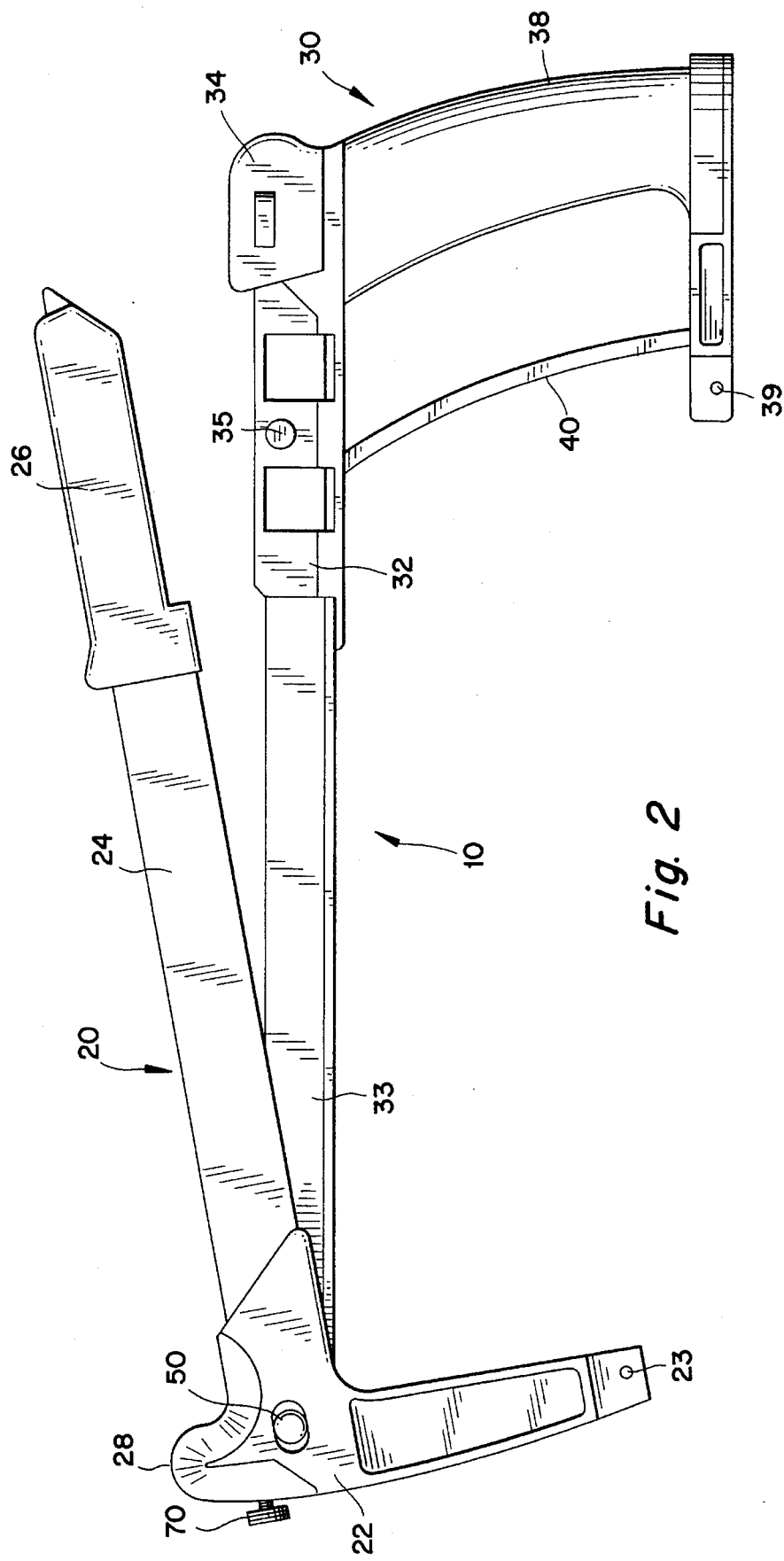
FIG. 2 shows a hacksaw according to the present invention with the lever assembly in the open position.
Figure 4:
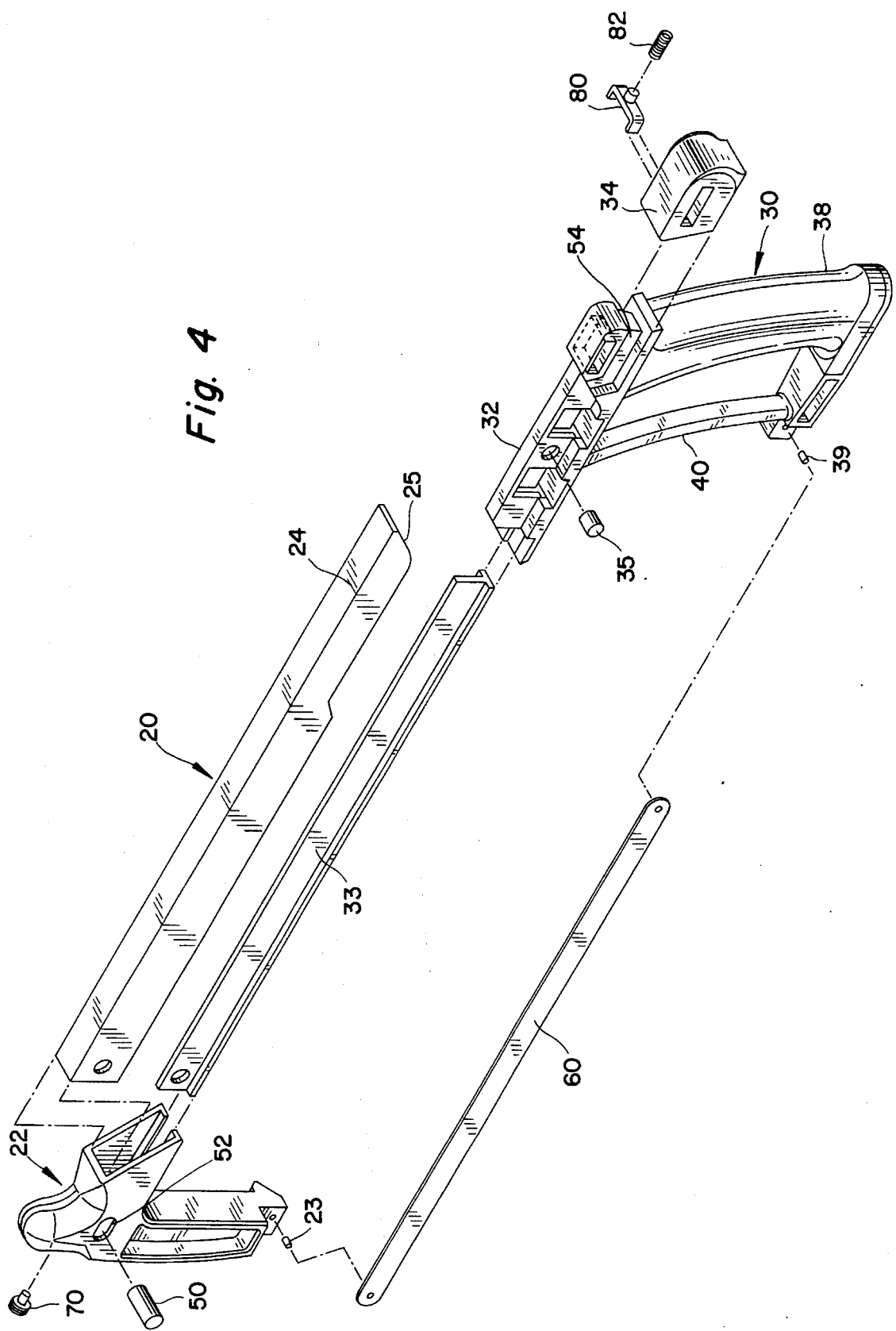
FIG. 4 shows an exploded view showing the spring mechanism of the present invention.
Figure 5:
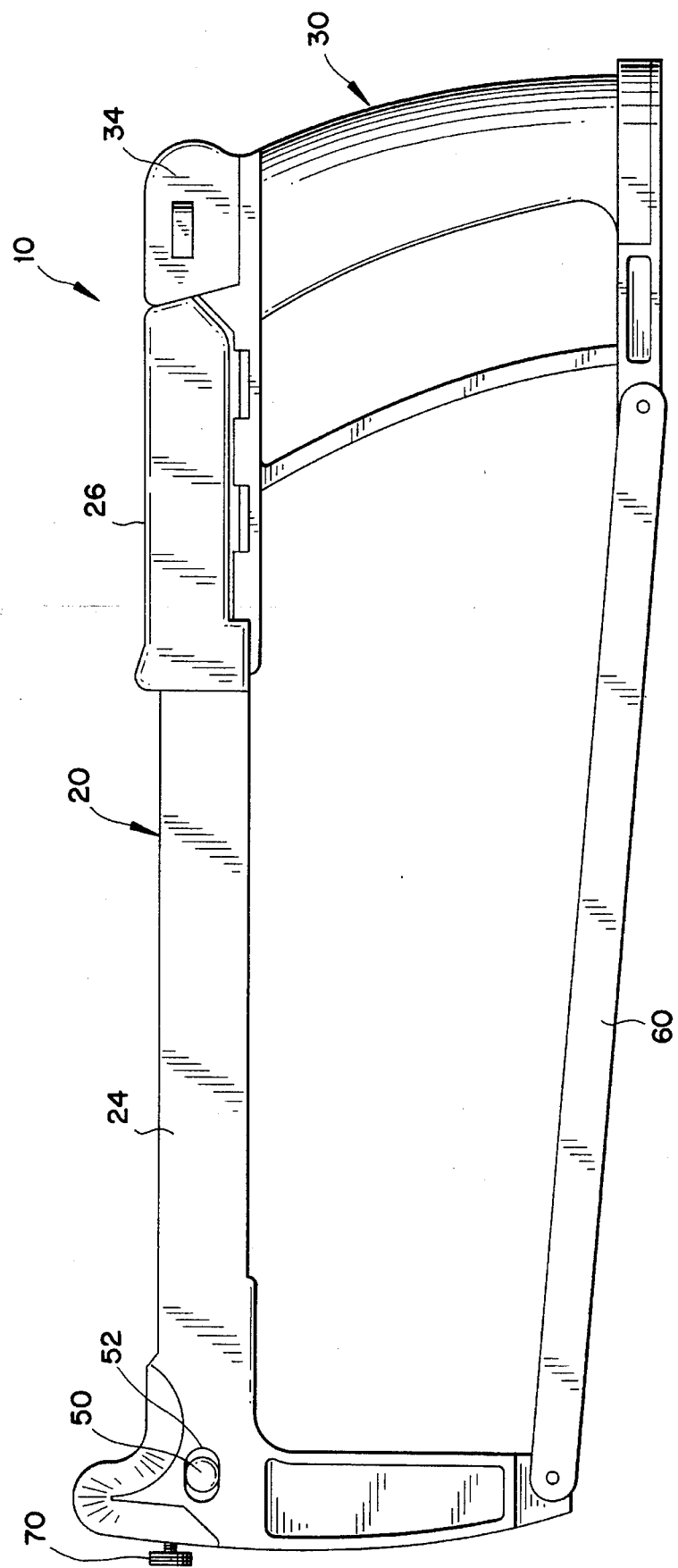
FIG. 5 shows a side view according to another embodiment of the present invention.

Referring now to FIG. 2, hacksaw 10 is shown in the open position with saw blade 60 removed. The major components of lever assembly 20 are U-channel lever 24, safety grip or top grip 26, and lever head 22. The U-channel lever 24 and the lever head 22 can be two piece as shown in FIG. 4 or one piece as shown in FIG. 5. Pistol grip assembly 30 is comprised of T-bar 33, pistol grip 38, handguard 40, and tension pin 39.

In operation, lever assembly 20 is connected to pistol grip assembly 30 by pivot 50 as shown in FIG. 2. Lever assembly 20 is in the open position. A saw blade 60 may be attached to tension pin 23 and tension pin 39. A U-channel lever 24 is rotated in a clockwise direction around pivot 50, tension pins 23 and 39 will put tension on a saw blade pulling a saw blade 60 to maximum tension.

Tension is important in saw blades for a number of reasons. The tension on the blade affects the straightness of the cut and reduces wear on the blade. If the saw blade is too slack, it also may lead to premature blade wear and breakage of the blade. Ideally a saw blade should have approximately 25,000–40,000 P.S.I. tension. Using a lever tensioning device as in the present invention a high tension can be placed on the blade without sacrificing handle comfort and efficient operation of the frame.

Thumb bar 28 allows an operator of hacksaw 10 to rest his one hand on lever assembly 20 and guide the blade. The other hand is held on pistol grip 38 in a normal fashion. Safety grip or top grip 26 operates in conjunction with spring-loaded lock 34 to hold the lever assembly in a locked position as shown in FIG. 1. In the preferred embodiment of the invention, spring loaded lock 34 slides on a channel 54 to the rear in order to allow U-channel lever 24 to pass by spring loaded lock 34. The spring 82 is positioned on the spring rest 80 which urges the spring loaded lock forward. See FIG. 4. The U-channel lever 24 has a lower angled surface 25 which engages the spring loaded lock 34 causing the spring loaded lock to slide rearwardly. Spring loaded lock 34 then slides forward to hold U-channel lever 24 in the down position. Inadvertent unlocking of U-channel lever 24 is prevented by safety grip 26. The safety grip 26 prevents the radial protrusion of the spring loaded lock 34, thus not allowing the spring loaded lock 34 to be susceptible to a frontal impact that would ordinarily urge the spring loaded lock 34 backward and inadvertently unlatch the U-channel lever 24. See FIG. 1.

Spare hacksaw blades are held under cushion grip safety grip 26 and lever 24. Magnet 35 holds the spare saw blades against surface 32 so operation of lever 24 is not obstructed as it approaches the locking position over T-bar 33.

Figure 3:
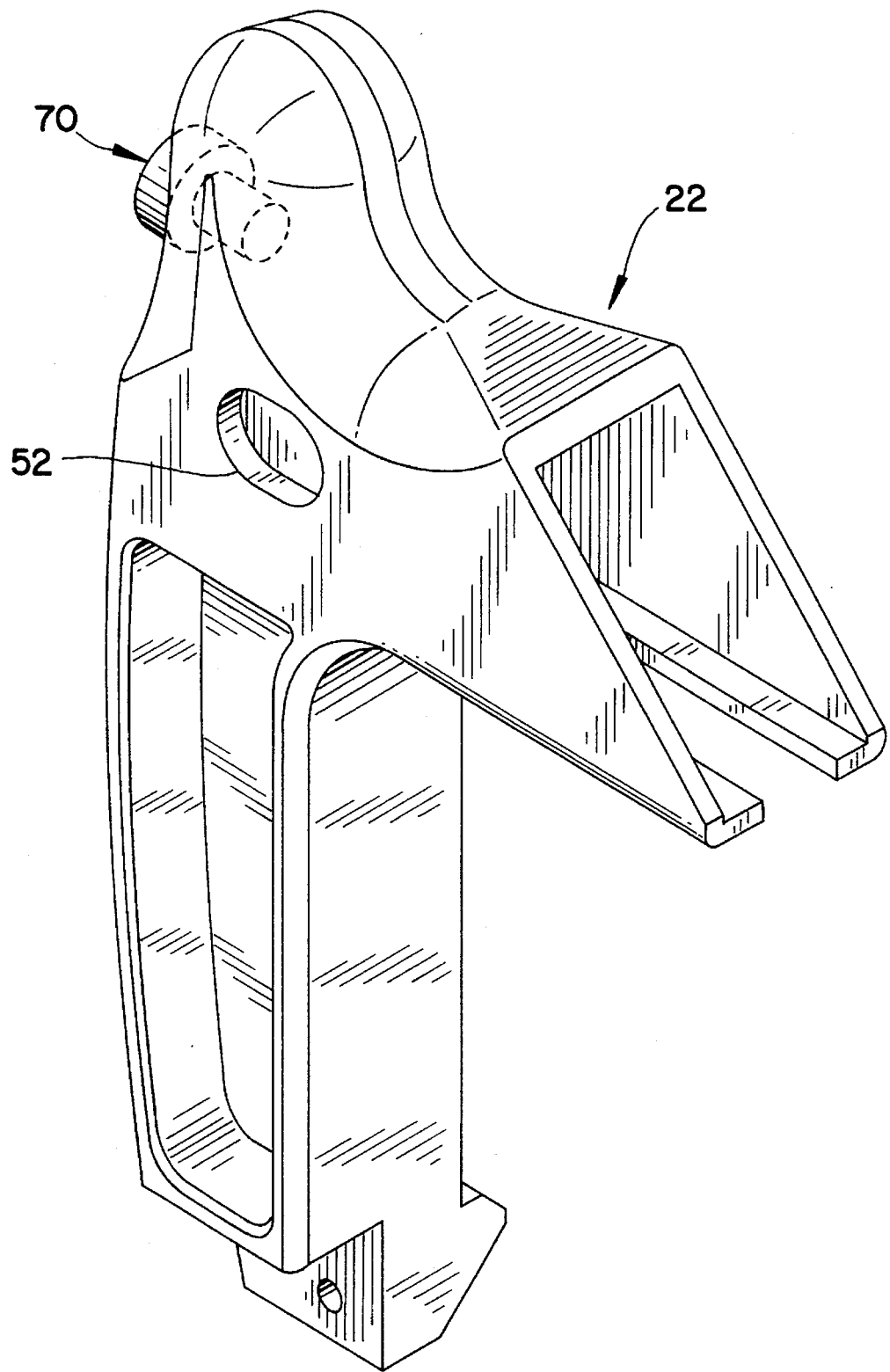
FIG. 3 shows a lever head in perspective according to the present invention.

Referring now to FIG. 3, lever head 22 is shown in more detail. Screw 70 provides a means of tensioning saw blade 60. Screw 70 abuts the end of the T-bar 33 for adjustment of the tension of the saw blade 60. Screw 70 may be moved inwardly or outwardly and moves T-bar 33 and U-channel lever 24 to adjust the distance between tension pins 23 and 39. This allows the tension on saw blades 60 to be adjusted. A knurled screw 70 may be used as shown for finger adjustment. The adjustment is normally made to screw 70 during the unlocked position as shown in FIG. 2. Thus the screw may be turned without any back pressure, which would be encountered if screw 70 was turned while there was tension on the blade in the locked position of the hacksaw 10 shown in FIG. 1. Slot 52 accepts pivot 50. The dimensions of slot 52 are such that pivot 50 may move forward and backward in the slot to adjust the pivot point.

We claim:

1. A hacksaw comprising:

a blade tensioning device having a lever head connected to a lever to form an angle;

a pistol grip assembly having a pistol grip connected to a first end of a T-bar;

a pivot connected to a second end of said T-bar wherein said pivot is connected to a slot in said lever head;

a saw blade having a first end connected to said pistol grip and a second end connected to said lever head so that as said lever head is moved said lever head rotates about said pivot putting tension on said saw blade;

a screw in said lever head which adjusts a distance between a first tension pin on said lever head and a second tension pin on said pistol grip by means of said slot in said lever head;

a locking mechanism generally located at one end of the pistol grip so as to contain said lever in a closed position; and a plurality of storage compartments formed by the spaces between said lever and said T-bar in which to store at least one additional hacksaw blade.

2. A hacksaw as in claim 1 where said lever head and said lever are fabricated as a one piece unit.

3. A hacksaw as in claim 1 where said locking mechanism is slidable.

4. A hacksaw as in claim 3 where said locking mechanism is spring-loaded.

5. A hacksaw comprising:

a blade tensioning device having a lever head connected to a lever to form an angle;

a pistol grip assembly having a pistol grip connected to a first end of a bar;

a pivot connected to a second end of said bar and to said lever head, said pivot allowing pivotal movement of the lever head and lever with respect to the bar; and, a saw blade having a first end connected to said pistol grip and a second end connected to said lever head so that as said lever head is moved said lever head rotates about said pivot putting tension on said saw blade.

6. A hacksaw as in claim 5 having a locking mechanism generally located at one end of the pistol grip so as to contain said lever in a closed position.

7. A hacksaw as in claim 5 wherein said lever head and said lever are fabricated as a one piece unit.

8. A hacksaw comprising:

a blade tensioning device having a lever head connected to a lever to form an angle;

a pistol grip assembly having a pistol grip connected to a first end of a T-bar, a pivot connected to a second end of said T-bar and to said lever head;

a saw blade having a first end connected to said pistol grip and a second end connected to said lever head so that as said lever head is moved said lever head rotates about said pivot putting tension on said saw blade; and a plurality of storage compartments formed by a space between said lever and said T-bar in which at least one additional hacksaw blade may be stored.

9. A hacksaw comprising:

a blade tensioning device having a lever head connected to a lever to form an angle;

a pistol grip assembly having a pistol grip connected to a first end of a T-bar, a pivot connected to a second end of said T-bar and to said lever head;

a saw blade having a first end connected to said pistol grip and a second end connected to said lever head so that as said lever head is moved said lever head rotates about said pivot putting tension on said saw blade; and a locking mechanism generally located at one end of the pistol grip so as to contain said lever in a closed position, wherein said locking mechanism is slidable.

10. A hacksaw as in claim 9 wherein said locking mechanism is spring loaded.

11. A hacksaw comprising:

a blade tensioning device having a lever head connected to a lever to form an angle;

a pistol grip assembly having a pistol grip connected to a first end of a T-bar;

a pivot connected to a second end of said T-bar and to said lever head;

a saw blade having a first end connected to said pistol grip and a second end connected to said lever head so that as said lever head is moved said lever head rotates about said pivot putting tension on said saw blade;

a locking mechanism generally located at one end of the pistol grip end so as to contain said lever in a closed position;

a cushion grip affixed to the pistol grip end of said lever so as to provide substantial interference with accidental dislodging of said locking mechanism; and a plurality of storage compartments formed by the space between said lever and said T-bar in which to store at least one additional hacksaw blade.

12. A hacksaw as in claim 11 where said lever head and said lever are fabricated as a one piece unit.

13. A hacksaw as in claim 11 where said locking mechanism is slidable.

14. A hacksaw as in claim 13 where said locking mechanism is spring loaded.

15. A hacksaw comprising:

a blade tensioning device having a lever head connected to a lever form an angle;

a pistol grip assembly having a pistol grip connected to a first end of a T-bar;

a pivot connected to a second end of said T-bar wherein said pivot is connected to a slot in said lever head;

a saw blade having a first end connected to said pistol grip and a second end connected to said lever head so that as said lever head is moved said lever head rotates about said pivot putting tension on said saw blade;

a screw in said lever head which adjusts a distance between a first tension pin on said lever head and a second tension pin on said pistol grip by means of said slot in said lever head;

a locking mechanism generally located at one end of the pistol grip so as to contain said lever in a closed position;

a cushion grip affixed to the pistol grip end of said lever so as to provide substantial interference with accidental dislodging of said locking mechanism; and a plurality of storage compartments formed by the space between said lever and said T-bar in which to store at least one additional hacksaw blade.

16. A hacksaw as in claim 15 where said lever head and said lever are fabricated as a one piece unit.

17. A hacksaw as in claim 13 where said locking mechanism is slidable.

18. A hacksaw as in claim 15 where said locking mechanism is spring loaded.

* * * * *